United States Patent
Watanabe

(10) Patent No.: US 6,611,350 B1
(45) Date of Patent: Aug. 26, 2003

(54) SYSTEM FOR CONTROLLING PRINTER AND METHOD OF CONTROLLING PRINTER

(75) Inventor: Yoshiaki Watanabe, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/385,408

(22) Filed: Aug. 30, 1999

(30) Foreign Application Priority Data

Aug. 28, 1998 (JP) .......................................... 10-259377

(51) Int. Cl.[7] .............................................. G06K 15/00
(52) U.S. Cl. ........................................ 358/1.15; 358/1.1
(58) Field of Search ................................. 358/1.1, 1.13, 358/1.15, 426.12, 434; 700/28, 32, 40, 100, 101, 102; 710/15, 14, 8, 38, 36, 40, 58, 62, 64, 72

(56) References Cited

U.S. PATENT DOCUMENTS 6,043,898 A * 3/2000 Jacobs ........................ 358/1.15
6,091,507 A * 7/2000 Vatland et al. ............. 358/1.15

* cited by examiner

Primary Examiner—Arthur G. Evans
(74) Attorney, Agent, or Firm—Oblon, Spivak, McClelland, Maier & Neustadt, P.C.

(57) ABSTRACT

A printer control system that is provided with a print server capable of acquiring the state information of the printer controlled by the various sorts of protocol and a method of controlling the printer system are disclosed. The server is constructed with system control section, LAN/WAN communication control section, request processing section, printer information storing section, protocol processing section, and printer state acquiring section. The respective sections are connected to each other through the system bus. The state acquiring request is received by the LAN/WAN communication control section, and the communication control section notifies the printer state acquiring section, of the received request. The printer information storing section stores the access protocol to the printer in the printer information table. The protocol processing section performs the communication and the analysis of the respective protocols. The printer state acquiring section retrieves the protocol information stored in the printer information table. The state of the printer can be acquired by using the stored protocol.

30 Claims, 3 Drawing Sheets

| PRINTER ADDRESS | PROTOCOL INFORMATION |
|---|---|
| 127.12.12.133 | PROTOCOL A |
| 127.12.12.115 | PROTOCOL B |

SYSTEM FOR CONTROLLING PRINTER AND METHOD OF CONTROLLING PRINTER

CROSS REFERENCE TO RELATED APPLICATION

This application claims benefit of priority to Japanese Patent Application No. JPAP10-259377 filed Aug. 28, 1998, the entire content of which is incorporated by reference herein.

BACKGROUND OF THE INVENTION

1. Field of the Invention

The present invention relates to a printer control system provided with a server for monitoring the state of the printer and a method of controlling the printer and the printer system.

2. Description of the Background

Up through the present, there have been various protocols for determining the state of a printer from the printer side. As such, when multiple printers are monitored from a client personal computer, a corresponding number of monitoring tools are needed to effectively determine the state of the printers. This approach is problematic in terms of complexity of management as well as efficiency because as the number of printers on the network increase, so does the number of tools. In addition, if the printers are from different manufacturers, the problem is compounded. In particular, problems with the user interface and operation of the multiple tools arise.

SUMMARY OF THE INVENTION

Heretofore, the background art regarding a system for controlling the printer and a method of controlling the printer is described. However, according to such background art, there exists no advantageous functional effect for such printer control system and method.

The present invention was made in order to solve the above-mentioned problems. Therefore, some objects of the present invention are as follows:

It is an object of the present invention to solve the problems of the background art as mentioned heretofore.

It is another object of the present invention to provide a printer control system including a server for monitoring the state of the printer.

It is still another object of the present invention to provide a printer control system including a server capable of acquiring the state information of the plural printers controlled by the various sorts of the protocols.

It is still another object of the present invention to provide a method of controlling the printer including a server for monitoring the state of the printer.

It is still another object of the present invention to provide a method of controlling the printer including a server capable of acquiring the state information of the plural printers controlled by the various sorts of the protocols.

Other objects, features, and advantages of the present invention will become apparent from the following detailed description when read in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
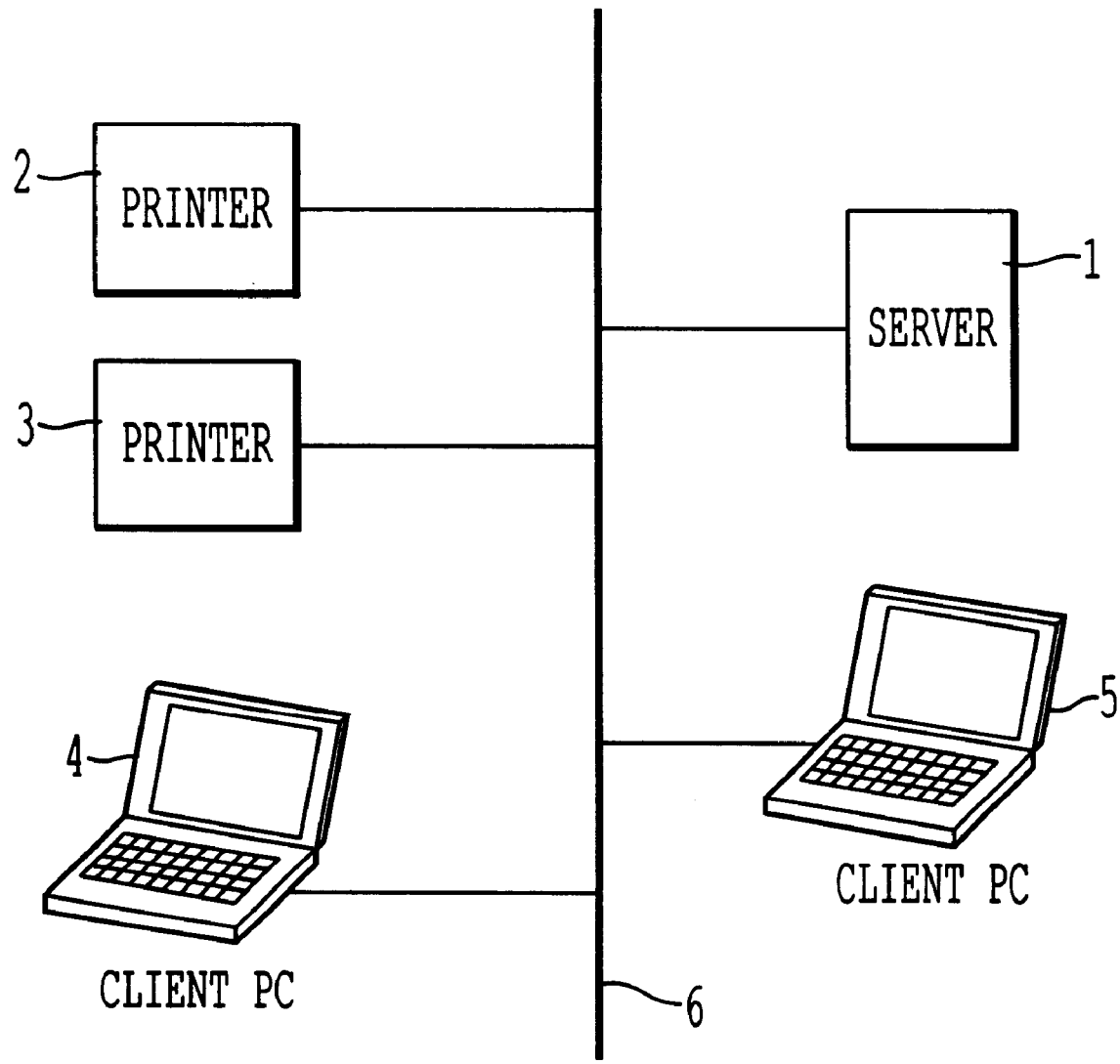
FIG. 1 is a block diagram illustrating the structure of the printer control system according to an embodiment of the present invention.

In describing preferred embodiment of the present invention illustrated in the drawings, specific terminology is employed for the sake of clarity. However, the present invention is not intended to be limited to the specific terminology so selected, and it is to be understood that each specific element includes all technical equivalents that operate in a similar manner.

Referring now to the drawings, wherein like reference numerals designate identical or corresponding parts throughout the several views, and more particularly to FIG. 1 and FIG. 2 thereof, the structure of a printer control system and a structure of the server that is included in the printer control system, according to the present invention, are illustrated hereinafter in detail in conjunction with the embodiment thereof with reference to all of the accompanying drawings.

In order to solve the aforementioned problems, the first embodiment aspect of the present invention provides a printer control system, which includes a server. Further the printer control system includes multiple personal computers and multiple printers. The server, personal computers, and printers are connected to a common network.

The server includes a printer state acquisition requirement receiving section for respectively receiving printer state acquisition requirements from the numerous personal computers, and a protocol information receiving section for receiving protocol information employed in the printers when the printer state acquisition requirements are received by the printer state acquisition requirement receiving section. Additional, the server possesses the following components: a protocol analyzing section for analyzing respective protocols that are received by the protocol information receiving section; a printer state information acquiring section for acquiring the state information of the plural printers on the basis of the respective protocols analyzed by the protocol analyzing section; and a printer state information notifying section for notifying the state information of the printers acquired by the printer state information acquiring section to the personal computer.

One embodiment of the present invention provides a printer control system in which the server includes a storing section for storing the protocol information that is analyzed by the protocol analyzing section.

Another embodiment of the present invention provides a printer control system in which if a printer employs a protocol not stored in the storing section, the server further includes a protocol retrieving section for retrieving the protocol. That is, the protocol retrieving section retrieves one of the respective protocols based upon a determination that the server cannot be accessed using any of the stored protocols.

Yet another embodiment of the present invention provides a printer control system in which, when the notification is performed by the printer state acquisition requirement notifying section, the personal computers respectively include a printer designating section for designating one or more optional printers. In other words, each of the personal computers is configured to designate one or more of the plurality of printers as optional.

Another embodiment of the present invention provides a method of controlling a printer by a server in a printer control system, which includes a server, personal computers, and printers. The server, personal computers, and printers are connected to each other over a network. The method includes the steps of receiving printer state acquisition requirements from the personal computers, and receiving the printer state acquisition requirement in the printer state acquisition requirement process, and at that time receiving the information employed in the plural printer. In addition, the method includes analyzing respective protocols that are received in the process of receiving the protocol information, acquiring the state information of the plural printers on the basis of the respective protocols that analyzed in the process of analyzing the protocols, and notifying the state information of the printers acquired in the process of acquiring the state information of the printers to the personal computer.

Yet another embodiment of the present invention provides a method of controlling a printer, including the step of storing information on the protocols that were analyzed in the process of analyzing the protocols.

Yet another embodiment of the present invention provides a method of controlling a printer, including the step of retrieving the protocol, when the printer provided with the protocol not stored in the process of storing.

Yet another embodiment of the present invention provides a method of controlling a printer, including designating one or more optional printers when the notification is performed in the process of notifying the printer state acquisition requirement. In other words, each of the personal computers is configured to designate one or more of the plurality of printers as optional.

The printer control system and method according to the present invention is described hereinafter in detail, referring to the accompanying drawings attached hereto. In FIGS. 1 through 4, the embodiment of the printer control system is illustrated.

FIG. 1 is a block diagram illustrating the printer control system according to an embodiment of the present invention. As shown in FIG. 1, a server 1 is connected to printers 2 and 3 over a local area network (LAN) 6 (or wide area network (WAN)). Client PCs 4 and 5 are also connected to the LAN (or WAN) 6. In an exemplary embodiment, the LAN 6 is an Ethernet network. It is apparent to one of ordinary skill in the art that other network implementations are possible.

Figures 2, 4:
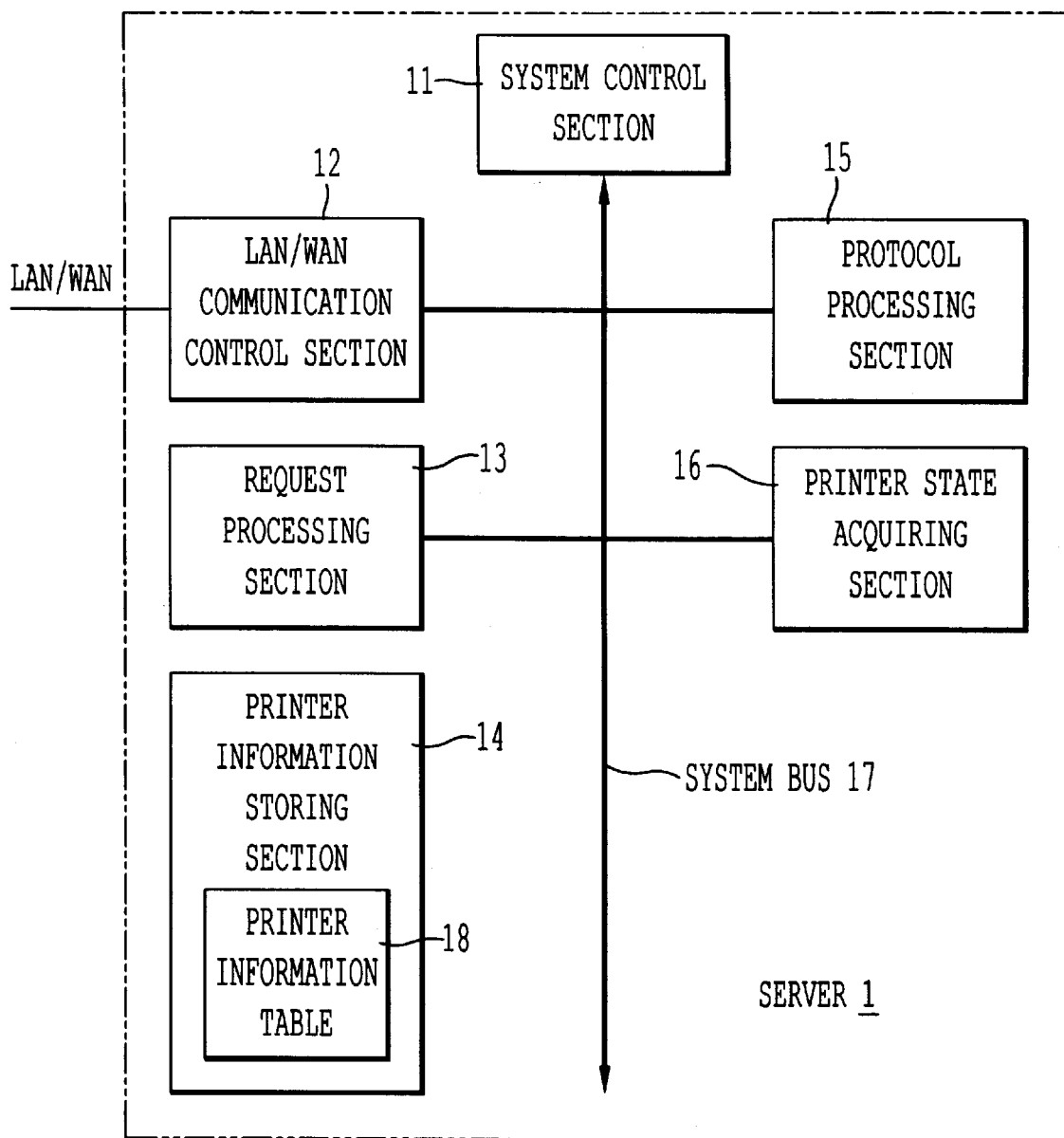
FIG. 2 is a block diagram illustrating the structure of the server included in the printer control system according to an embodiment of the present invention.
FIG. 4 is a diagram illustrating an exemplary structure of the printer information table of the printer information storing part in a server, in accordance with an embodiment of the present invention.

FIG. 2 is a block diagram illustrating the structure of the server, which is included in the printer control system according to an embodiment of the present invention. In FIG. 2, the server 1 has a system controlling section 11, a LAN/WAN communication control section 12, a request processing section 13, a printer information storing section 14, a protocol processing section 15, and a printer state acquiring section 16. The above-mentioned respective sections are connected to each other through a system bus 17.

The system control section 11 performs the fundamental control of the entire printer control system, for instance, memory control, etc. The LAN/WAN communication control section 12 performs the control of the communication necessary to interface with network 6. The LAN/WAN communication section 12 also receives the state acquiring request and information on the state of the printer, and supplies the protocol processing section 15 of such received information. The request processing section 13 also receives the state acquiring request from the protocol processing section 15 and forwards the request to the printer state acquiring section 16.

The printer information storing section 14 stores the access protocol to access the printer in the printer information table 18. The protocol processing section 15 analyzes the respective protocols. The printer state acquiring section 16 retrieves the protocol information that is stored in the printer information table 18 of the printer information storing section 14. Using the retrieved protocol the print state acquiring section 16 acquires the state of the connected printer.

Figure 3:
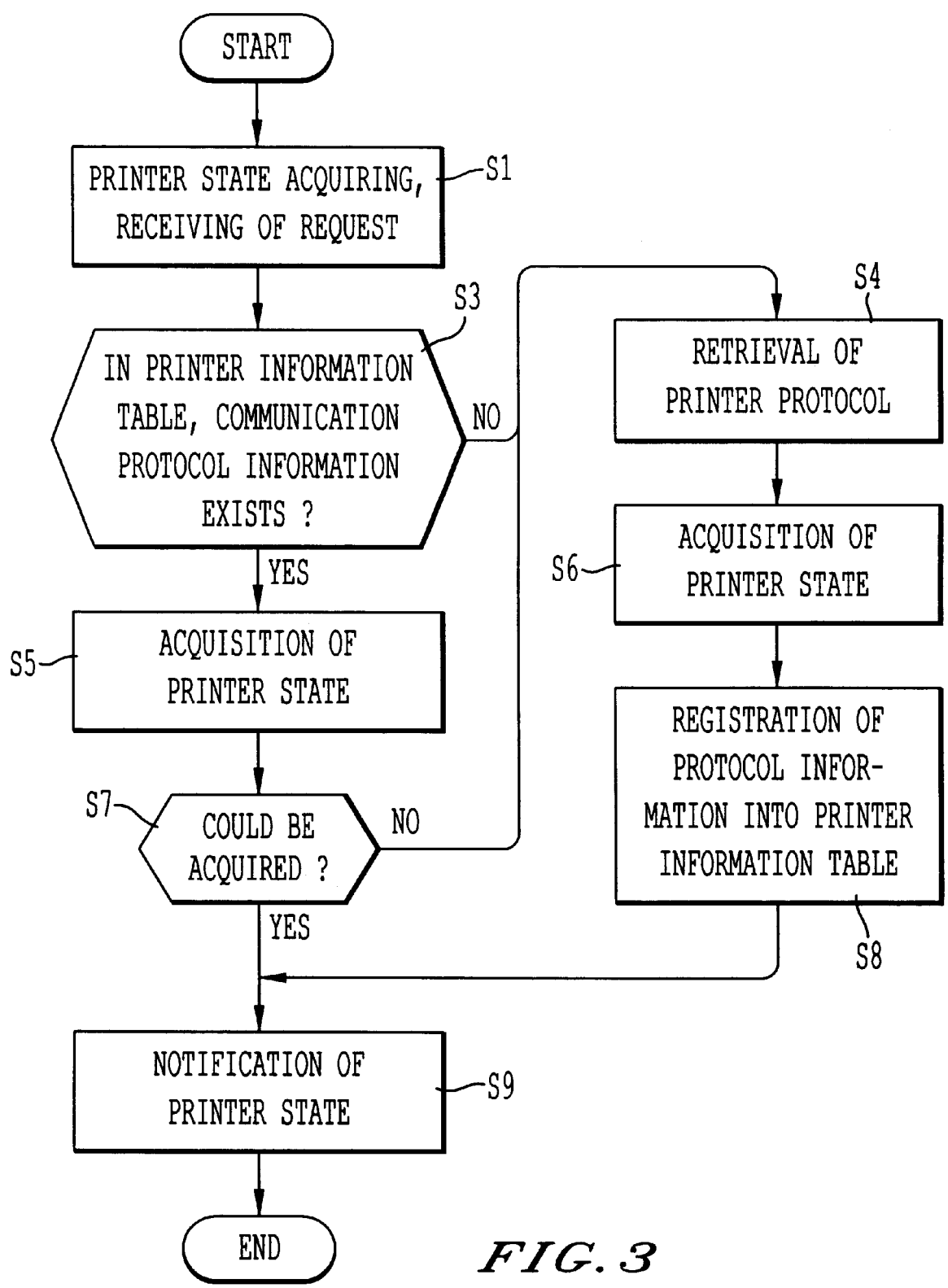
FIG. 3 is a flowchart illustrating an exemplary operation according to an embodiment of the present invention.

FIG. 3 is a flowchart showing the operation in the printer control system according to an embodiment of the present invention. The LAN/WAN communication control section 12 receive the state acquiring request from either or both client PCs 4 and 5, and supplies the protocol processing section 15 with the received information (Step S1). The protocol processing section 15 then notifies the request processing section 13 of the state acquiring request. In turn, the request processing section 13 forwards the state acquiring request to the printer State acquiring section 16. The printer state acquiring section 16 determines whether the communication protocol information is registered by the printer address key (Step S3). If the protocol is registered (Step S3, YES), the printer state acquiring section 16 initiates a state acquiring request to the protocol processing section 15 in which an attempt to acquire the state using the registered protocol is made (Step S5). When the state of the printer cannot be acquired with the registered protocol (Step S7, NO), the retrieval of the protocol from the printer is performed (Step S4). Similarly, turning back to step S3, when the protocol is not registered, the printer state acquiring section 16 retrieves the protocol (Step S4). With respect to step S4, the retrieval request of the protocol involves the interaction between the printer state acquiring section 16 and the protocol processing section 15. In particular, the protocol processing section 15 accesses the printer, which has the proper, operable protocol, to retrieve the protocol. The protocol processing section 15 then informs the printer state acquiring section 16 of the operable protocol.

Upon obtaining knowledge of the protocol, the printer state acquiring section 16 issues the printer state acquiring request to the protocol processing section 13, thereby acquiring the state of the printer (Step S6). In the step S6, the retrieved protocol information in registered in the printer information table 18 of the printer information storing section 14 (Step S8). The printer state acquiring section 16 notifies the request processing section 13 of the state (of the printer), after acquiring the printer state. The request processing section 13 notifies the client PCs 4 and 5 of the printer state by using the protocol processing section 15.

FIG. 4 shows an example of data that is registered in the printer information table of the printer information storing part in the server according to an embodiment of the present invention. As shown in FIG. 4, the a table entry of the information table 18 includes the printer address and the protocol information. The information supported by the printer is entered as protocol information. For instance, in the printer with an address of 127.12.12.133, the communication control is governed by the protocol A. Likewise, the printer with address 127.12.12.115 employs protocol B. Although the format of the printer address in the above example conforms with the Internet Protocol (IP), any network addressing scheme can be utilized.

Thus, the protocol information retrieved and processed in the step S4 shown in FIG. 3 is also written in the above-mentioned printer information table 18.

As is apparent from the foregoing description, according to the printer control system and the printer control method of the present invention, the protocol retrieval processing function resides within the server. As the result, the state can be supplied to a client PC. Under this approach, the user interface is improved.

Furthermore, according to the printer control system and the printer control method, the protocol of the printer that is accessed once is stored (in memory), and thus, the retrieval of the protocol of the printer need not be performed again. As the result, the load imposed on the network can be reduced, and the speed of the user interface is enhanced.

Furthermore, according to the printer control system and the printer control method, even if a printer that has been accessed once is replaced by another printer, the former printer can be monitored. Therefore, the operability can be improved.

Furthermore, according to the printer control system and the printer control method, the user can designate the desired printer for the printer state information, and therefore, only the necessary printer information can be displayed by the client PC.

The embodiment of the present invention has been described heretofore. However, obviously, other numerous embodiments or numerous modifications or variations of the invention are possible in light of the above teachings, It is therefore to be understood that, within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent if the United States is:

1. A system for controlling a printer comprising:
   a plurality of personal computers connected to a network;
   a plurality of printers connected to the network, each of the plurality of printers utilizing a respective protocol to communicate, in part, with the personal computers; and
   a server connected to the network, wherein the server includes:
   (1) a communication control section configured to receive a printer state acquisition requirement message from each of the personal computers;
   (2) a protocol processing section configured to receive protocol information in response to the printer state acquisition requirement message, the protocol information including a respective protocol that is utilized by each of the plurality of printers;
   (3) a protocol analyzing section configured to analyze respective protocols received by the protocol processing section; and
   (4) a printer state acquiring section configured to acquire state information of the printers selectively utilizing the respective protocols, wherein the state information is sent to the respective personal computers.

2. A system according to claim 1, wherein the server further comprises a storing section configured to store the protocol information.

3. A system according to claim 2, wherein the server further comprises a protocol retrieving section configured to retrieve one of the respective protocols that is not stored.

4. A system according to claim 3, wherein the protocol retrieving section retrieves one of the respective protocols based upon a determination that the server cannot be accessed using any stored protocols.

5. A system according to claim 3, wherein the protocol retrieving section retrieves one of the respective protocols based upon a determination that the server cannot be accessed using any stored protocols.

6. A system according to claim 1, wherein each of the personal computers is configured to designate one or more of the plurality of printers as optional.

7. A system according to claim 2, wherein each of the personal computers is configured to designate one or more of the plurality of printers as optional.

8. A system according to claim 3, wherein each of the personal computers is configured to designate one or more of the plurality of printers as optional.

9. A system according to claim 4, wherein each of the personal computers is configured to designate one or more of the plurality of printers as optional.

10. A system according to claim 5, wherein each of the personal computers is configured to designate one or more of the plurality of printers as optional.

11. A method of controlling a printer comprising the steps of:
   receiving a printer state acquisition requirement message from a plurality of personal computers;
   receiving protocol information from a plurality of printers in response to the printer state acquisition requirement message, the protocol information including a respective protocol that is utilized by each of the plurality of printers;
   analyzing the respective protocols;
   acquiring state information from the plurality of printers by selectively utilizing the respective protocols; and
   supplying the state information to the respective personal computers.

12. A method according to claim 11, further comprising storing the protocol information.

13. A method according to claim 12, further comprising retrieving one of the respective protocols that is not stored.

14. A method according to claim 12, further comprising retrieving one of the respective protocols based upon a determination that the server cannot be accessed using any stored protocols.

15. A method according to claim 13, further comprising retrieving one of the respective protocols based upon a determination that the server cannot be accessed using any stored protocols.

16. A method according to claim 11, further comprising designating one or more of the plurality of printers as optional.

17. A method according to claim 12, further comprising designating one or more of the plurality of printers as optional.

18. A method according to claim 13, further comprising designating one or more of the plurality of printers as optional.

19. A method according to claim 14, further comprising designating one or more of the plurality of printers as optional.

20. A method according to claim 15, further comprising designating one or more of the plurality of printers as optional.

21. A system for controlling a printer comprising:
- a plurality of personal computers connected to a network;
- a plurality of printers connected to the network, each of the plurality of printers utilizing a respective protocol to communicate, in part, with the personal computers; and
- a server connected to the network, wherein the server includes:
  (1) a communication control means for receiving respectively a printer state acquisition requirement message from each of the personal computers;
  (2) a protocol processing means for receiving protocol information in response to the printer state acquisition requirement message, the protocol information including the respective protocol that is utilized by each of the plurality of printers;
  (3) a protocol analyzing means for analyzing the respective protocols received by the protocol processing section; and
  (4) a printer state acquiring means for acquiring the information of the printers by selectively utilizing the respective protocols, wherein the state information is sent to the respective personal computers.

22. A system according to claim 21, wherein the server further comprises a storing means for storing the protocol information.

23. A system according to claim 22, wherein the server further comprises a protocol retrieving means for retrieving one of the respective protocols that is not stored.

24. A system according to claim 23, wherein the protocol retrieving means retrieves one of the respective protocols based upon a determination that the server cannot be accessed using any stored protocols.

25. A system according to claim 23, wherein the protocol retrieving means retrieves one of the respective protocols based upon a determination that the server cannot be accessed using any stored protocols.

26. A system according to claim 21, wherein each of the personal computers is configured to designate one or more of the plurality of printers as optional.

27. A system according to claim 22, wherein each of the personal computers is configured to designate one or more of the plurality of printers as optional.

28. A system according to claim 23, wherein each of the personal computers is configured to designate one or more of the plurality of printers as optional.

29. A system according to claim 24, wherein each of the personal computers is configured to designate one or more of the plurality of printers as optional.

30. A system according to claim 25, wherein each of the personal computers is configured to designate one or more of the plurality of printers as optional.

* * * * *